(12) United States Patent
Tanaka

(10) Patent No.: US 9,195,888 B2
(45) Date of Patent: Nov. 24, 2015

(54) DOCUMENT REGISTRATION APPARATUS AND NON-TRANSITORY COMPUTER READABLE MEDIUM

(71) Applicant: FUJI XEROX CO., LTD., Minato-ku, Tokyo (JP)

(72) Inventor: Kazuya Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/305,731

(22) Filed: Jun. 16, 2014

(65) Prior Publication Data

US 2015/0110401 A1 Apr. 23, 2015

(30) Foreign Application Priority Data

Oct. 21, 2013 (JP) ................................. 2013-218712

(51) Int. Cl.
*G06K 9/00* (2006.01)
*G06K 9/46* (2006.01)

(52) U.S. Cl.
CPC .......... *G06K 9/00442* (2013.01); *G06K 9/4604* (2013.01)

(58) Field of Classification Search
CPC ............ G06K 9/4604; G06K 9/00463; G06K 9/00442; G06K 9/00449; G06K 9/34; G06K 9/342; G06K 9/344; G06K 9/46
See application file for complete search history.

(56) References Cited

U.S. PATENT DOCUMENTS

| 4,550,434 A | * | 10/1985 | Shimada et al. | .............. 382/144 |
| 5,228,100 A | * | 7/1993 | Takeda et al. | ................. 382/175 |
| 6,466,954 B1 | * | 10/2002 | Kurosawa et al. | ............ 715/209 |
| 2004/0267734 A1 | * | 12/2004 | Toshima | .......................... 707/3 |
| 2012/0066213 A1 | * | 3/2012 | Ohguro | ........................ 707/723 |

FOREIGN PATENT DOCUMENTS

| JP | 2000-315211 A | 11/2000 |
| JP | 2006-331274 A | 12/2006 |
| JP | 2011-065640 A | 3/2011 |

* cited by examiner

*Primary Examiner* — Brian Le
(74) *Attorney, Agent, or Firm* — Sughrue Mion, PLLC

(57) ABSTRACT

A document registration apparatus includes a receiving unit that receives a request for registration of a registration candidate document from a new registrant, a word extracting unit that extracts a word from the registration candidate document, a registrant information acquiring unit that acquires information on the new registrant, an associating unit that associates the extracted word with a group to which the new registrant belongs, a first storage unit that stores history information, a second storage unit that stores an identifier of a previous registrant and a group to which the previous registrant has belonged, an extracting unit that extracts an identifier of a previous registrant who registered a word identical to the extracted word, and extracts a group to which the previous registrant has belonged, a registration permission determining unit that determines whether to allow registration, and a document registering unit that registers the registration candidate document.

9 Claims, 14 Drawing Sheets

FIG. 2

| | WORD | USER ID |
|---|---|---|
| 64~ | DocuTray | U001 |
| | DocuMobile | U001 |
| 66~ | DocuTray | U003 |
| | DocuServer | U004 |
| | ⋮ | ⋮ |

Columns: 60, 62

FIG. 3

| | USER ID | USER NAME | BELONGING GROUP ID | TITLE |
|---|---|---|---|---|
| 78~ | U001 | TARO FUJI | G001, G002, G003 | MANAGER |
| | U002 | JIRO FUJI | G001, G004 | MANAGER |
| 80~ | U003 | HANAKO FUJI | G002 | |
| | U004 | SHIRO FUJI | G002, G003 | |
| 82~ | U005 | GORO FUJI | G003 | |
| | ⋮ | ⋮ | ⋮ | ⋮ |

Columns: 70, 72, 74, 76

FIG. 4

| | GROUP ID | GROUP NAME | ADMINISTRATOR ID |
|---|---|---|---|
| 96 | G001 | DocuMobile Planning | U001 |
| 98 | G002 | DocuTray Planning | U001 |
| 100 | G003 | DocuTray Development | U001 |
| | G004 | MobilePrinter Planning | U002 |
| | ⋮ | ⋮ | ⋮ |

90 92 94

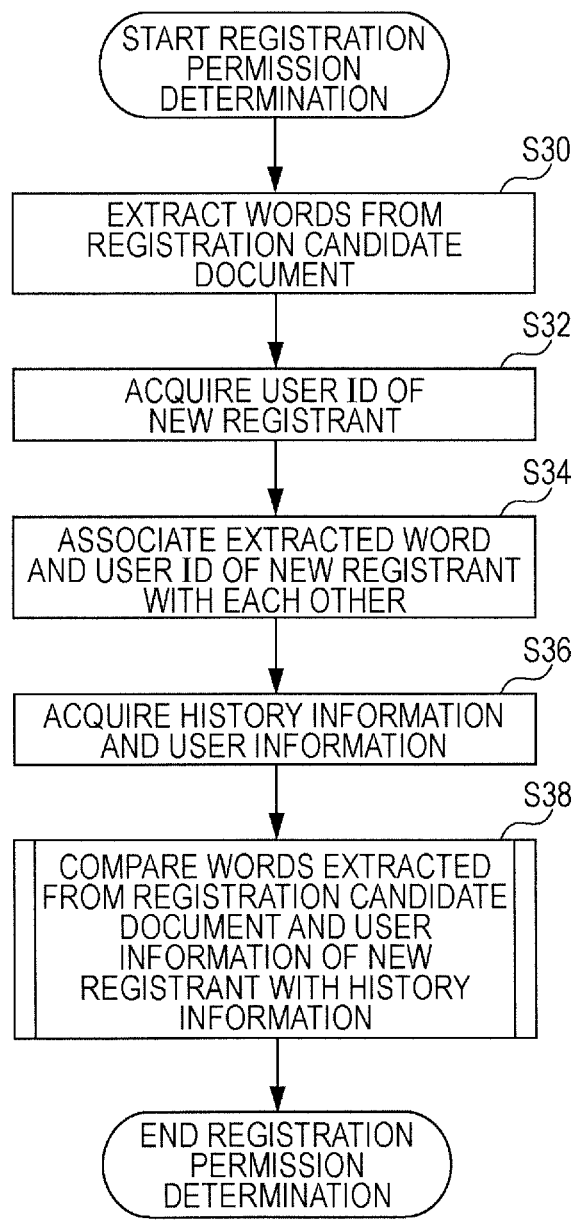

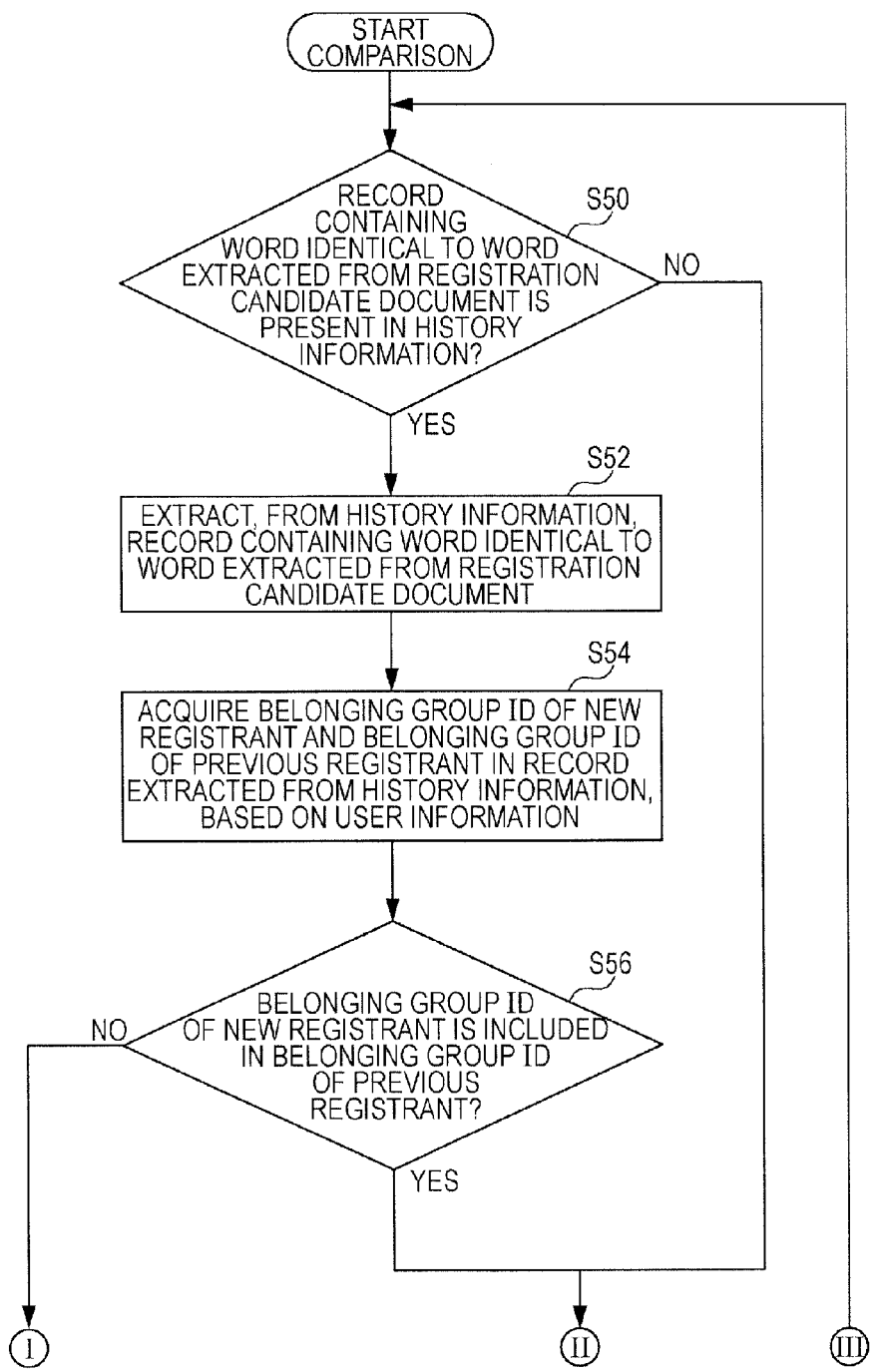

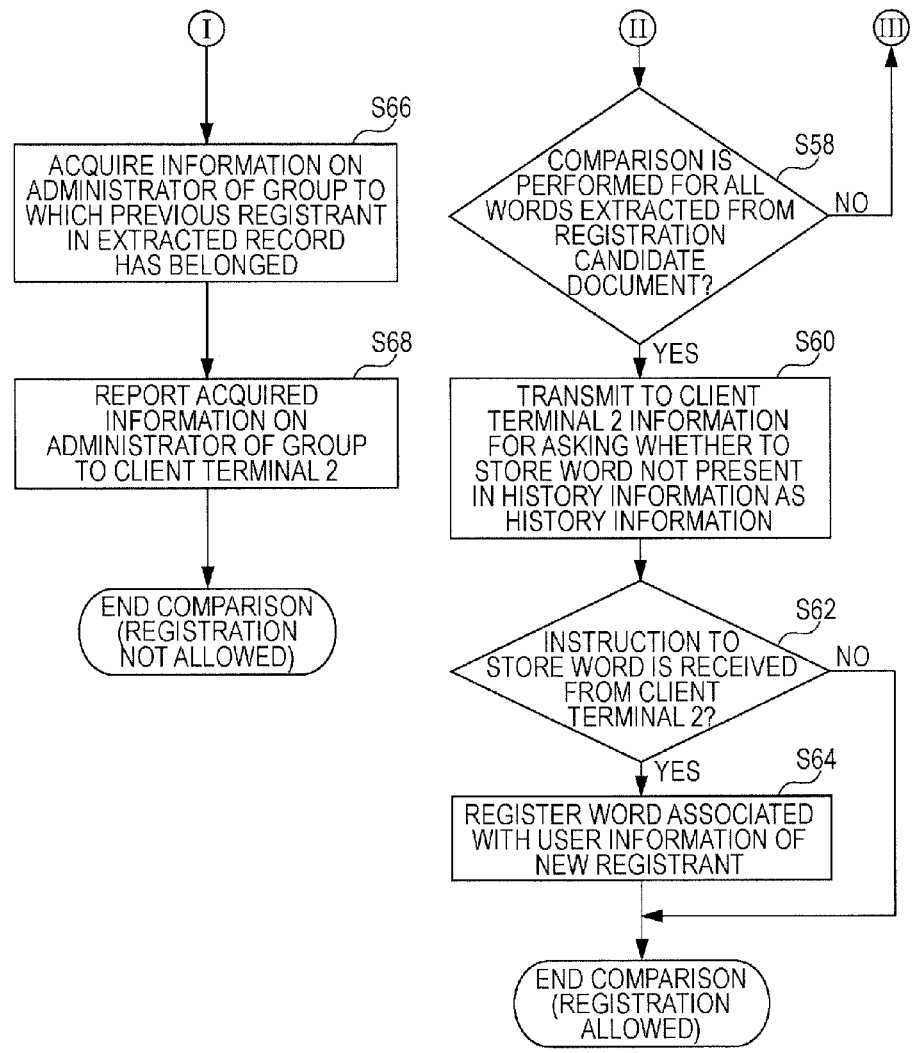

FIG. 8

| WORD | USER ID |
|---|---|
| DocuTray | U005 |
| MobilePrinter | U005 |

| | WORD 60 | USER ID 62 | REGISTRATION DATE 140 |
|---|---|---|---|
| 142 | DocuTray | U001 | 04/01/2007 |
| | DocuMobile | U001 | 04/03/2010 |
| 144 | DocuTray | U003 | 02/03/2010 |
| | DocuServer | U004 | 04/01/2010 |
| | ⋮ | ⋮ | ⋮ |

FIG. 14

| | USER ID 80 | USER NAME 82 | BELONGING GROUP ID 150 | TITLE 152 |
|---|---|---|---|---|
| 154 | U001 | TARO FUJI | G001(04/01/2000:03/31/2005), G002(04/01/2005:03/31/2010), G003(04/01/2010:) | MANAGER (04/01/2008:) |
| | U002 | JIRO FUJI | G001(04/01/2004:03/31/2010), G004(04/01/2010:) | MANAGER (04/01/2010:) |
| 156 | U003 | HANAKO FUJI | G002(04/01/2005:) | |
| | U004 | SHIRO FUJI | G002(04/01/2005:03/31/2010), G003(04/01/2010:) | |
| 158 | U005 | GORO FUJI | G003(04/01/2010:) | |
| | ⋮ | ⋮ | ⋮ | ⋮ |

DOCUMENT REGISTRATION APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2013-218712 filed Oct. 21, 2013.

BACKGROUND

Technical Field

The present invention relates to a document registration apparatus and a non-transitory computer readable medium.

SUMMARY

According to an aspect of the invention, there is provided a document registration apparatus including: a receiving unit that receives a request for registration of a registration candidate document from a new registrant; a word extracting unit that extracts a word from the registration candidate document; a registrant information acquiring unit that acquires information on the new registrant; an associating unit that associates the word extracted from the registration candidate document with information indicating a group to which the new registrant belongs; a first storage unit that stores history information, the history information containing a registered word that is extracted from a document previously requested to be registered and an identifier of a previous registrant who registered the registered word, in association with each other; a second storage unit that stores the identifier of the previous registrant and information indicating a group to which the previous registrant has belonged, in association with each other; an extracting unit that reads the history information from the first storage unit, extracts an identifier of a previous registrant who previously registered a registered word identical to the word extracted from the registration candidate document, on the basis of the history information, and extracts a group to which the previous registrant has belonged, on the basis of the identifier of the previous registrant and association stored in the second storage unit; a registration permission determining unit that determines whether to allow registration of the registration candidate document, on the basis of whether the group to which the new registrant belongs is included in the group to which the previous registrant has belonged; and a document registering unit that registers the registration candidate document, if the registration permission determining unit determines to allow the registration.

BRIEF DESCRIPTION OF THE DRAWINGS

Exemplary embodiments of the present invention will be described in detail based on the following figures, wherein:

FIG. 2 illustrates the data configuration of history information;

FIG. 3 illustrates an example of the data configuration of user information;

FIG. 4 illustrates the data configuration of group information;

FIG. 6 is a flowchart illustrating the details of processing of a step;

FIGS. 7A and 7B are flowcharts illustrating the details of processing of a step;

FIG. 8 illustrates the data configuration in which words and user IDs are associated;

FIG. 13 illustrates the data configuration of history information according to a third exemplary embodiment;

FIG. 14 illustrates an example of the data configuration of user information according to the third exemplary embodiment.

DETAILED DESCRIPTION

Hereinafter, a document registration apparatus according to exemplary embodiments of the present invention will be described. However, the present invention is not limited to the following exemplary embodiments.

First Exemplary Embodiment

Figure 1:
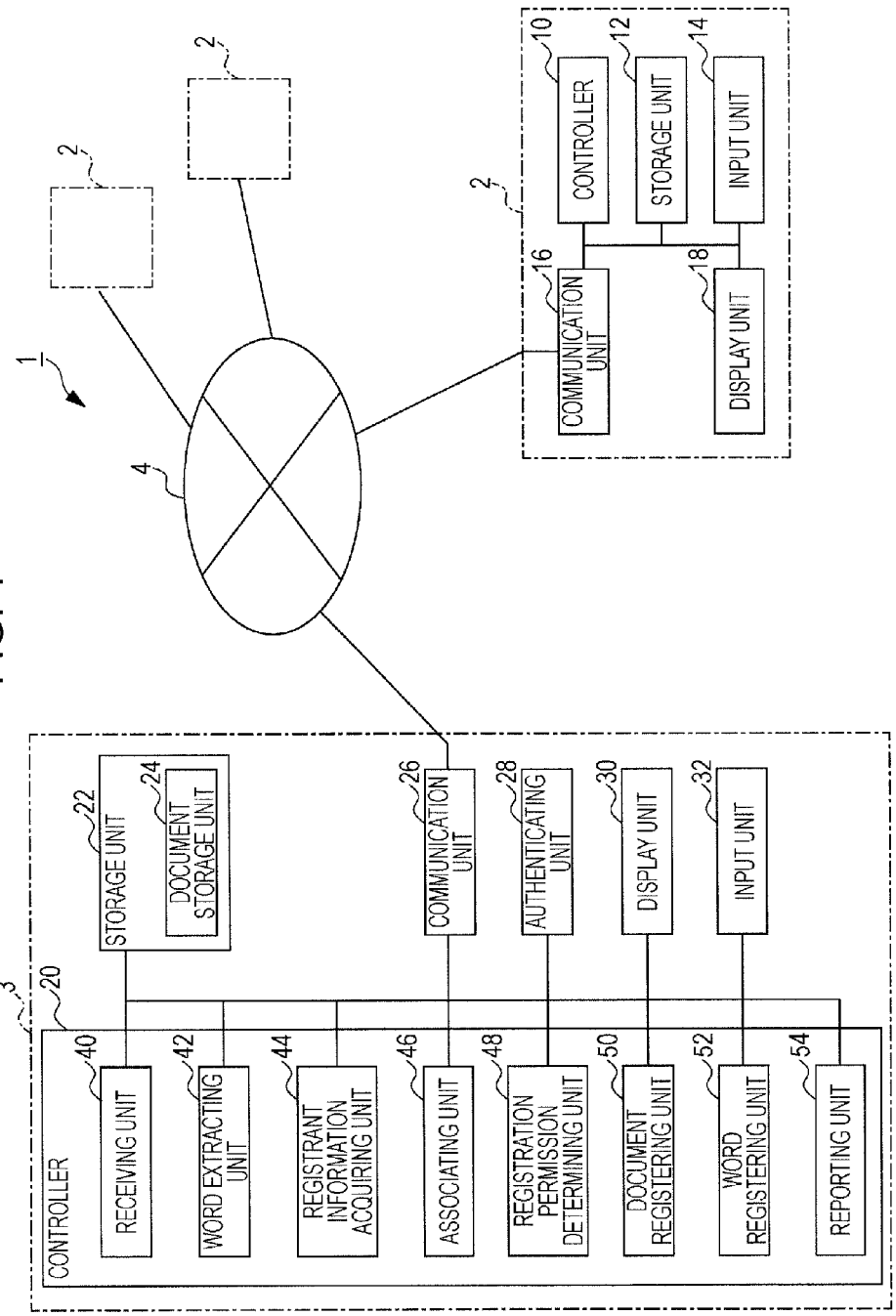
FIG. 1 schematically illustrates the configuration of a document registration system according to an exemplary embodiment.

FIG. 1 schematically illustrates the configuration of a document registration system 1 according to this exemplary embodiment. The document registration system 1 includes a client terminal 2, a document registration apparatus 3, and a network 4 that connects the client terminal 2 and the document registration apparatus 3 to each other. The present exemplary embodiment illustrates an example in which the document registration apparatus 3 is a server, and the document registration system 1 forms a server client system. However, the document registration apparatus 3 may be, for example, an apparatus such as a multifunction apparatus that the user can directly operate without connecting to the network 4.

The client terminal 2 is a personal computer or a mobile terminal, for example. The client terminal 2 includes a controller 10 such as a CPU; a storage unit 12 such as a ROM, a RAM, and a hard disk; an input unit 14 such as a keyboard, a mouse, and a touch panel; a communication unit 16 such as a LAN card for connecting to the network 4; and a display unit 18 such as a monitor. The document registration system 1 may include plural client terminals 2.

The document registration apparatus 3 includes a controller 20, a storage unit 22, a communication unit 26, and an authenticating unit 28. In the case where the document registration apparatus 3 is a multifunction apparatus or the like, the document registration apparatus 3 may further include a display unit 30 that displays the processing content and the like of the document registration apparatus 3, and an input unit 32 for the user to input instructions to the document registration apparatus 3.

The controller 20 is a CPU of the document registration apparatus 3, and includes a receiving unit 40, a word extracting unit 42, a registrant information acquiring unit 44, an associating unit 46, a registration permission determining unit 48, a document registering unit 50, a word registering unit 52, and a reporting unit 54.

The storage unit 22 includes a ROM, a RAM, and a hard disk, for example, and stores data and the like processed by the document registration apparatus 3. The storage unit 22 stores a program for causing a server serving as the document registration apparatus to function as each of the units included in the document registration apparatus 3. Further, the storage unit 22 includes a document storage unit 24 that stores a document registered by the document registration apparatus 3.

The storage unit 22 stores, as history information, a word that is extracted from a document previously registered or previously requested to be registered and is registered, in association with information on a user who registered the registered document. Hereinafter, a document previously registered is referred to as a registered document; a word that is extracted from a document previously registered or a document previously requested to be registered and that is registered is referred to as a registered word; and a user who registered a registered document is referred to as a previous registrant.

The term "document" is a concept including an electronic document that is electronically generated, and data that is obtained by scanning a paper document. A document may include not only text data, but also image data and audio data. The image data may be in any format as long as words can be extracted by an optical character reader (OCR). Further, the audio data may be in any format as long as words can be extracted by speech recognition technology. Examples of formats of documents include plain-text format, proprietary document formats of word processors and spreadsheet applications containing text data, document formats with a structure such as HTML and XML, image formats such as a JPEG format and a PNG format, audio formats such as a wav format and an MP3 (MPEG1/2 Audio Layer 3) format, and data obtained by decoding data in these formats. The following describes an example in which a document is an electronic document.

FIG. 2 illustrates the data configuration of history information. The history information is represented by a table containing a word column 60 and a user ID column 62. In the table illustrated in FIG. 2, a user ID "U001" is associated with a registered word "DocuTray", for example. This indicates that the registered word "DocuTray" is registered in response to a registration request from a previous registrant with the user ID "U001".

The storage unit 22 stores user information. FIG. 3 illustrates the data configuration of user information. The user information is represented by a table containing a user ID column 70, a user name column 72, a belonging group ID column 74, and a title column 76. In the table illustrated in FIG. 3, the user name "TARO FUJI", the belonging group IDs "G001, G002, G003", and the title "MANAGER" are associated with the user ID "U001", for example. The record with a blank in the title field indicates that a user with the user ID in the record is an employee with no title. Note that, in this exemplary embodiment, plural belonging group IDs may be associated with a single user ID. This is because, group IDs of all the groups to which a user has belonged are associated with their user ID as belonging group IDs.

In this exemplary embodiment, in the history information, only the user ID of a previous registrant who registered a registered word is associated with the registered word. However, in the history information, the user name of the previous registrant, the belonging group ID, the title, and the like may be associated with the registered word.

The storage unit 22 stores group information. FIG. 4 illustrates the data configuration of group information. The group information is represented by a table containing a group ID column 90, a group name column 92, and an administrator ID column 94. In the table illustrated in FIG. 4, a group name "DocuMobile Planning" and an administrator ID "U001" are associated with a group ID "G001", for example. This indicates that the group name of the group with the group ID "G001" is "DocuMobile Planning", and the administrator of the group is a user with the administrator ID "U001".

The document storage unit 24 has plural folders each storing a registered document. For example, a user who wishes to register an electronic document specifies a folder in which the electronic document is to be registered, in accordance with the confidential level of the electronic document, the range of the reader of the electronic document, or the like. In this exemplary embodiment, not all the folders in the document storage unit 24 are the subject of registration permission determination. For example, only in the case of registering an electronic document in some of the folders for storing highly confidential documents, the document registration apparatus 3 determines whether to allow registration.

The communication unit 26 is a LAN card, for example, and communicates with the client terminal 2 and the like via the network 4.

The authenticating unit 28 authenticates a user of the document registration apparatus 3. For example, if a request for connection to the document registration apparatus 3 is received from the client terminal 2, the authenticating unit 28 transmits, to the client terminal 2, image data requesting the user to enter a user ID and password. Then, the authenticating unit 28 authenticates the user on the basis of the user ID and password entered by the user using the input unit 14 of the client terminal 2.

The receiving unit 40 receives from the client terminal 2 a request for registration of an electronic document in the document registration apparatus 3. The request for registration of an electronic document contains an electronic document that is the subject of the request for registration, and information specifying the registration destination of the electronic document, that is, any of the folders of the document storage unit 24. Hereinafter, an electronic document that has newly become the subject of a request for registration in the document registration apparatus 3 is referred to as a registration candidate document, and a user who made a request for registration of a registration candidate document is referred to as a new registrant.

The word extracting unit 42 extracts words from a registration candidate document. The word extraction unit 42 extracts the entire text of the registration candidate document, and performs morphological analysis on the extracted text so as to identify the word class of each word. In this exemplary embodiment, the word extraction unit 42 extracts only words that are identified as words (an unknown words) whose word class is unknown by morphological analysis. Alternatively, the extracted words may be compared with dictionary data of a language dictionary, a biographical dictionary, and the like, and words excluding the words contained in the dictionary data may be extracted. Further alternatively, all the words that are obtained by morphological analysis may be extracted.

The registrant information acquiring unit 44 acquires information on a new registrant. The registrant information acquiring unit 44 acquires the user ID of the new registrant from the authenticating unit 28.

The associating unit 46 associates the user ID of the new registrant acquired by the registrant information acquiring unit 44 with the words extracted from the registration candidate document by the word extracting unit 42.

The registration permission determining unit 48 determines whether the registration candidate document may be registered, that is, whether a registration candidate document may be stored in the document storage unit 24. The registration permission determining unit 48 determines whether to allow registration of the registration candidate document, on the basis of information on the new registrant associated with the word extracted from the registration candidate document and information on the previous registrant who registered a registered document containing a registered word identical to the extracted word. The detailed steps of registration permission determination will be described below with reference to a flowchart.

The document registering unit 50 registers a registration candidate document in a specified folder in the document storage unit 24, if the registration permission determining unit 48 determines that registration is allowed.

The word registering unit 52 stores the words extracted from the registration candidate document and the user ID of the new registrant associated with the words, as history information in the storage unit 22.

The reporting unit 54 reports the result of the request for registration of the registration candidate document to the client terminal 2. For example, the reporting unit 54 transmits, to the client terminal 2, image data indicating whether the registration candidate document is registered. Further, in the case where the document registration apparatus 3 is a multifunction apparatus or the like, information indicating whether the registration candidate document is registered may be displayed on the display unit 30 of the document registration apparatus 3.

Figure 5:
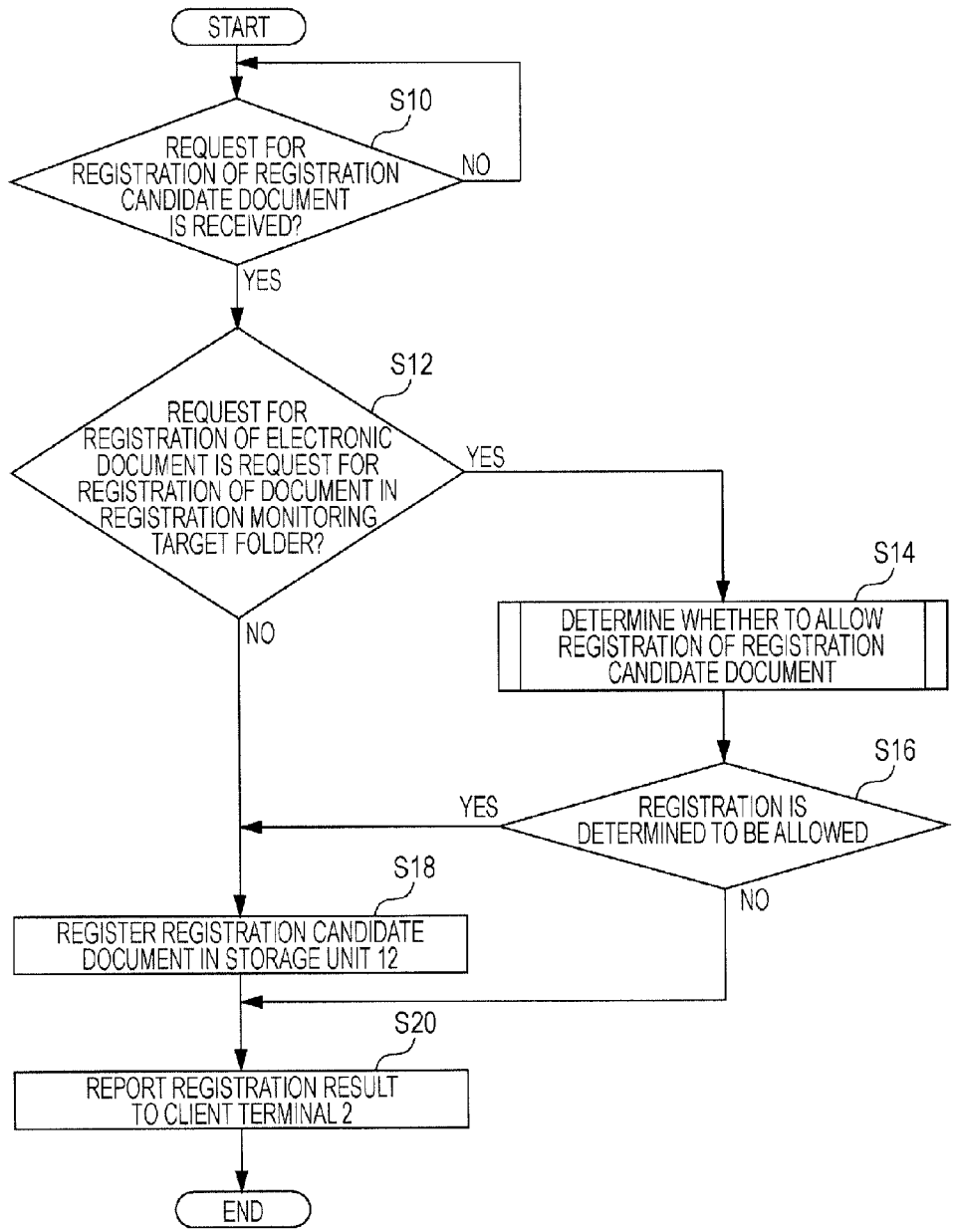
FIG. 5 is a flowchart illustrating the flow of processing according to a first exemplary embodiment.

The following describes the flow of processing performed by the document registration apparatus 3 according to this exemplary embodiment. FIG. 5 is a flowchart illustrating the flow of processing according to the first exemplary embodiment.

In step S10, the receiving unit 40 determines whether a request for registration of a registration candidate document in the document registration apparatus 3 is received. If a request for registration of a registration candidate document is received, the process proceeds to step S12. If a request for registration is not received, a determination is made again as to whether a request for registration is received (that is, the receiving unit 40 is placed in a state of waiting for a request for registration).

In step S12, the controller 20 determines whether the folder in the document storage unit 24 specified as the registration destination of the registration candidate document is a registration monitoring target folder. If the folder of the registration destination is a registration monitoring target folder, the process proceeds to step S14. If the folder of the registration destination is not a registration monitoring target folder, the process proceeds to step S18.

In step S14, the registration permission determining unit 48 determines whether to allow registration of the registration candidate document. FIG. 6 is a flowchart illustrating the details of processing of step S14.

In step S30, the word extracting unit 42 extracts words from the registration candidate document. As mentioned above, in this exemplary embodiment, the word extracting unit 42 performs morphological analysis on the entire text of the registration candidate document, and extracts words that are identified as unknown words.

In step S32, the registrant information acquiring unit 44 acquires the acquired user ID of the new registrant from the authenticating unit 28.

In step S34, the associating unit 46 associates the user ID of the new registrant extracted in step S32 with the words extracted in step S30. FIG. 8 illustrates the data configuration in which words and user IDs are associated. FIG. 8 illustrates that, in step S30, words "DocuTray" and "MobilePrinter" are extracted from the registration candidate document, and the new registrant is a user with the user ID "U005".

In step S36, the registration permission determining unit 48 reads the history information of FIG. 2 and the user information of FIG. 3 from the storage unit 22.

In step S38, the registration permission determining unit 48 compares the words extracted from the registration candidate document, information on the new registrant associated with the extracted words, with the history information and user information read from the storage unit 22, and thereby determines whether to allow registration of the registration candidate document.

FIGS. 7A and 7B are flowcharts illustrating the details of processing of step S38.

In step S50, the registration permission determining unit 48 determines, for one of the words extracted from the registration candidate document, whether a record containing a word identical to the extracted word is present in the history information. In step S30, since the words "DocuTray" and "MobilePrinter" are extracted from the registration candidate document as illustrated in FIG. 8, the registration permission determining unit 48 first determines whether a record containing the word "DocuTray" is present in the history information. In the case where the table of in FIG. 2 is stored as history information, the history information has records 64 and 66 containing the word "DocuTray", and therefore the registration permission determining unit 48 determines that the word "DocuTray" is present in the history information. If the registration permission determining unit 48 determines that the word extracted from the registration candidate document is present in the history information, the process proceeds to step S52. If the registration permission determining unit 48 determines that the word extracted from the registration candidate document is not present in the history information, the process proceeds to step S58.

In step S52, the registration permission determining unit 48 extracts from the history information the records 64 and 66 containing a word identical to the word "DocuTray" extracted from the registration candidate document. Note that the word identical to the word "DocuTray" includes a certain range of words. For example, words that differ only in whether letters are uppercase or lowercase and words that differ only in whether characters are double-byte or single-byte, such as "docutray" and "docutray", may be identified as being identical.

In step S54, the registration permission determining unit 48 first acquires the group to which the new registrant belongs, on the basis of the user ID of the new registrant acquired in step S32 and the user information of FIG. 3. In this exemplary embodiment, since the user ID of the new registrant is "U005", the registration permission determining unit 48 acquires "G003" as the group to which the new registrant belongs, by referring to a record 82 of the user information.

Subsequently, the registration permission determining unit 48 acquires the group to which the previous registrant has belonged, on the basis of the user ID in the record extracted in step S52 and the user information. In this exemplary embodiment, the registration permission determining unit 48 acquires the user IDs "U001" and "U003" of the previous registrants from the respective records 64 and 66, and acquires groups "G001, G002, G003" and "G002" of the respective user IDs "U001" and "U003", by referring to records 78 and 80 of the user information. Accordingly, the groups to which the previous registrants have belonged are "G001, G002, G003".

In step S56, the registration permission determining unit 48 determines whether the group of the new registrant acquired in step S54 is included in the groups of the previous registrants acquired also in step S54. If the group to which the new registrant belongs is determined to be included in the groups to which the previous registrants have belonged, the process proceeds to step S58. If the group to which the new registrant belongs is determined not to be included in the groups to which the previous registrants have belonged, the process proceeds to step S66. In this exemplary embodiment, since the group "G003" to which the new registrant belongs is included in the groups "G001, G002, G003" to which the previous registrants have belonged, the process proceeds to step S58. The processing from step S66 onward will be described in a second exemplary embodiment.

In step S58, the registration permission determining unit 48 determines whether the comparison is performed for all the words extracted from the registration candidate document. If the registration permission determining unit 48 determines that the comparison is performed for all the extracted words, the process proceeds step S60. If the registration permission determining unit 48 determines that the comparison is not performed for all the extracted words, the process returns to step S50, and the processing from step S50 onward is performed on the word for which the comparison is not performed. In this exemplary embodiment, the words "DocuTray" and "MobilePrinter" are extracted from the registration candidate document. However, since the comparison processing of steps S50 through S56 is not completed for "MobilePrinter", the process returns to step S50. Then, the processing from step S50 onward is performed on "MobilePrinter".

In the history information illustrated in FIG. 2, there is no record containing the word "MobilePrinter". Accordingly, in the processing of step S50 for "MobilePrinter", the registration permission determining unit 48 determines that the word extracted from the registration candidate document is not present in the history information. Then, the process proceeds to step S58 again. In step S58, the registration permission determining unit 48 determines that the comparison is performed for all the extracted words, and the process proceeds to step S60.

In step S60, the reporting unit 54 transmits, to the client terminal 2, information for asking the new registrant whether to store the word that is extracted from the registration candidate document and is not present in the history information, as history information in the storage unit 22. In this exemplary embodiment, the word "MobilePrinter" extracted from the registration candidate document is the word that is not present in the history information. Accordingly, the reporting unit 54 asks the new registrant whether to store "MobilePrinter" as history information.

Figure 9:
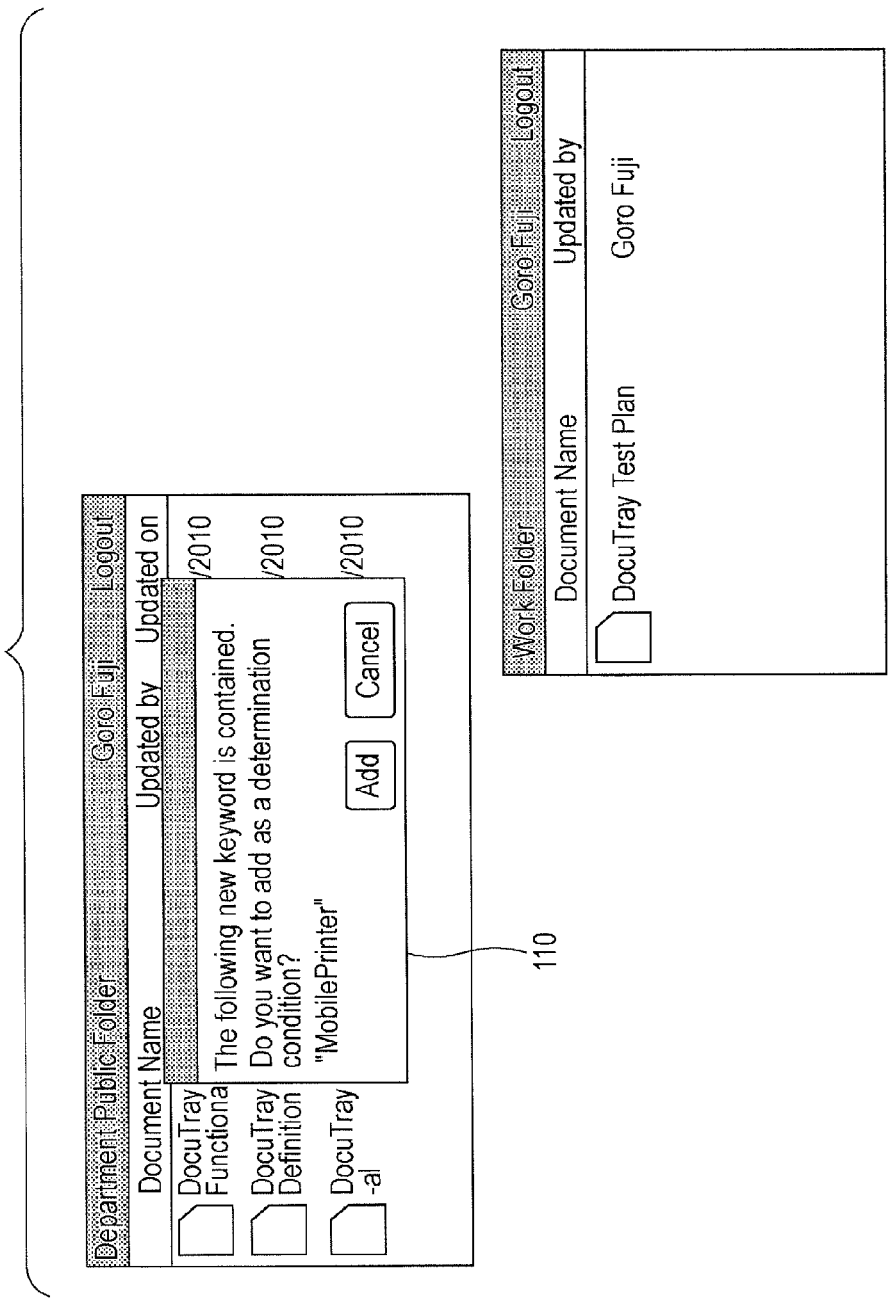
FIG. 9 illustrates an image displayed by a display unit so as to request an instruction from a new registrant.

FIG. 9 illustrates an image displayed by the display unit 18 so as to request an instruction from a new registrant. For example, the reporting unit 54 causes the display unit 18 to display a pop-up 110 as illustrated in FIG. 9, and prompts the new registrant to issue an instruction to store the word that is not present in the history information, as history information in the storage unit 22, or an instruction not to store the word. The new registrant enters either one of an instruction to store the extracted word as history information or an instruction not to store the extracted word in the client terminal 2, and transmits the instruction to the document registration apparatus 3.

In step S62, the word registering unit 52 determines whether an instruction to store the extracted word as history information in the storage unit 22 is received from the client terminal 2. If an instruction to store the extracted word is received, the process proceeds to step S64. If an instruction to store the extracted word as history information in the storage unit 22 is not received from the client terminal 2, that is, if an instruction not to store the extracted word as history information is received from the client terminal 2, the comparison is completed, and the process proceeds to step S16 of FIG. 5.

In step S64, the word registering unit 52 stores the word that is extracted from the registration candidate document and is not present in the history information, information, as history information in the storage unit 22. In this exemplary embodiment, a record 102 containing the word "MobilePrinter" extracted from the registration candidate document and the user ID "U005" of the new registrant, which are associated with each other in step S34 as illustrated in FIG. 8, is added to the table of the history information of FIG. 2. When the processing of step S64 is completed, the process proceeds to step S16 of FIG. 5.

Note that, in the case where all the words extracted from the registration candidate document are included in the history information in the processing of steps S50 through S58, the process proceeds from step S58 directly to step S16, without performing processing of steps S60 through S64.

In step S16, the registration permission determining unit 48 refers to the result of the determination whether to allow registration of the registration candidate document. If registration is allowed, the process proceeds to step S18. If registration is not allowed, the process proceeds to step S20.

In step S18, the document registering unit 50 registers the registration candidate document in the specified folder in the document storage unit 24.

Figure 10:
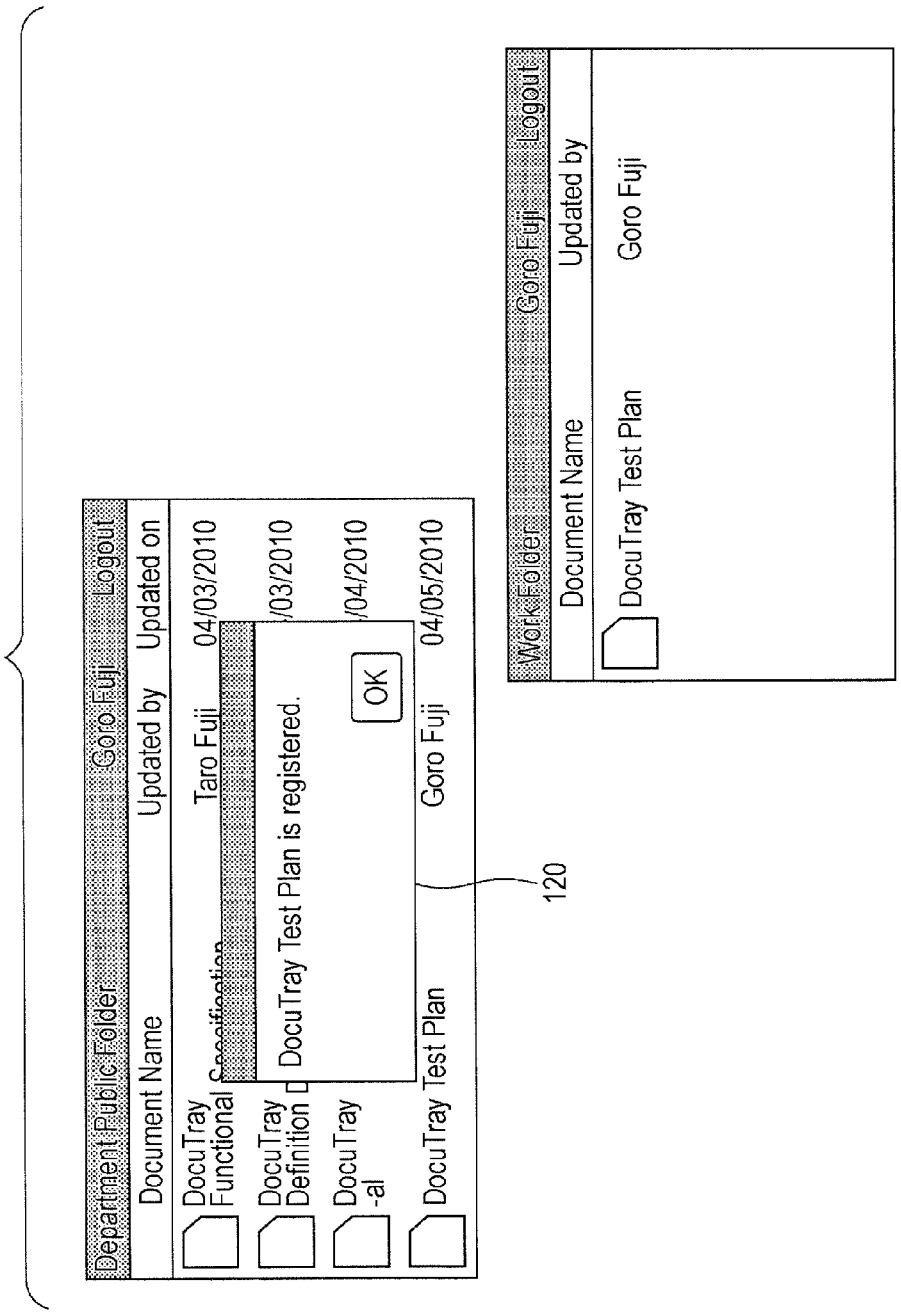
FIG. 10 illustrates an image for reporting the registration result of a registration candidate document.

In step S20, the reporting unit 54 reports the result of the request for registration of the registration candidate document to the client terminal 2. FIG. 10 illustrates an image for reporting the registration result of a registration candidate document. The reporting unit 54 causes the display unit 18 to display an image containing a pop-up 120 as illustrated in FIG. 10, for example, and reports the result of the request for registration of the registration candidate document to the new registrant. In FIG. 10, an example of the case in which registration is allowed. In the case where registration is not allowed, a pop-up with a message "DocuTray plan cannot be registered" is displayed in place of the pop-up 120.

Second Exemplary Embodiment

In the first exemplary embodiment, a determination is made as to whether to allow registration of a registration candidate document, on the basis of the group to which the new registrant belongs and the group to which the previous registrant has belonged. In a second exemplary embodiment, a determination is made as to whether to allow registration of a registration candidate document, on the basis of the group and the title of the new registrant and the group and the title of the previous registrant.

Figure 11:
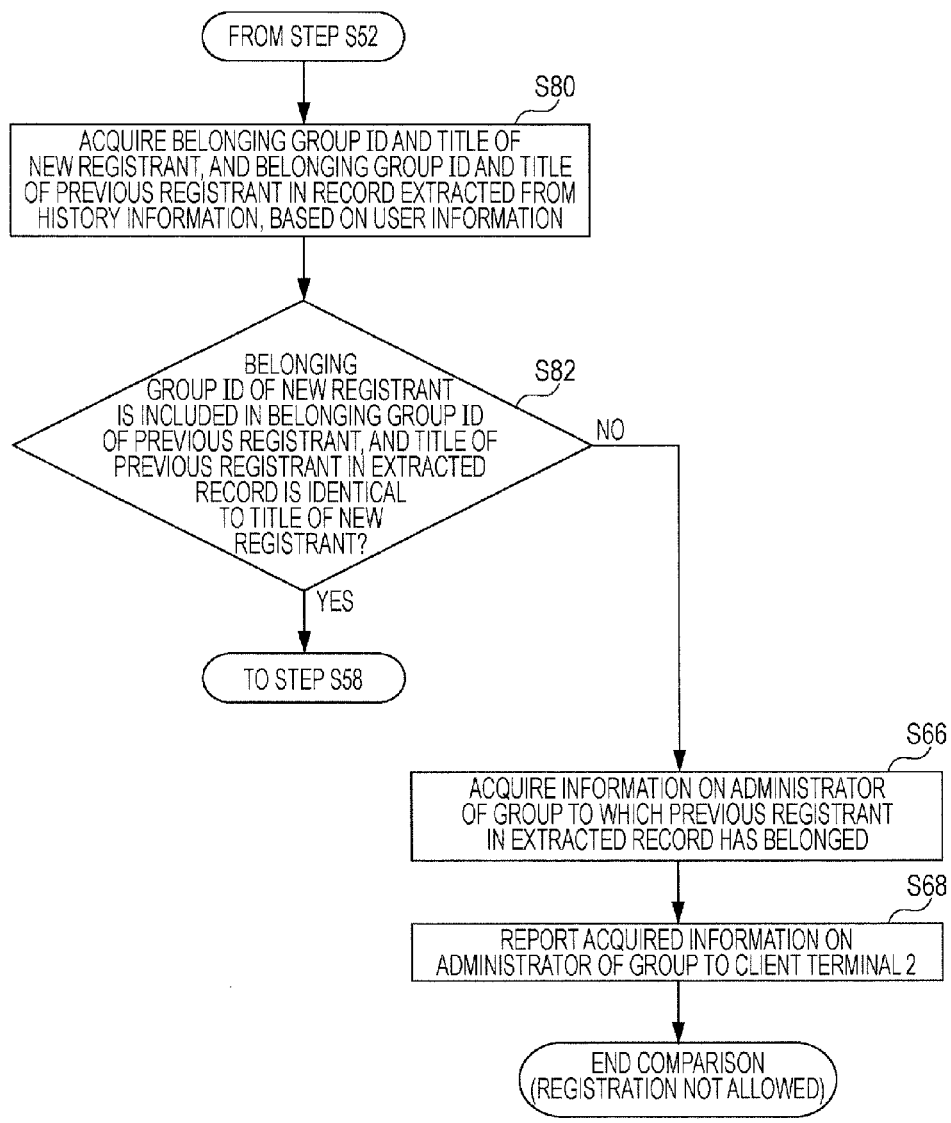
FIG. 11 is a flowchart illustrating the flow of processing according to a second exemplary embodiment.

FIG. 11 is a flowchart illustrating the flow of processing according to the second exemplary embodiment. The second exemplary embodiment differs from the first exemplary embodiment only in the processing of steps S54 and S56, and the processing of the other steps is the same. Therefore, a description of the steps already described will be omitted.

In step S80, the registration permission determining unit 48 first acquires the group to which the new registrant belongs and their title, on the basis of the user ID of the new registrant acquired in step S32 and the user information of FIG. 3. In this exemplary embodiment, since the user ID of the new registrant is "U005", the registration permission determining unit 48 acquires "G003" as the group to which the new registrant belongs and acquires "none" as their title, by referring to the record 82 of the user information.

Subsequently, the registration permission determining unit 48 acquires the group to which the previous registrant has belonged and their title, on the basis of the user ID in the record extracted in step S52 and the user information. In this exemplary embodiment, the registration permission determining unit 48 acquires the user IDs "U001" and "U003" of the previous registrants from the respective records 64 and 66. Then, the registration permission determining unit 48 acquires the groups "G001, G002, G003" to which the user with the user ID "U001" has belonged and their title "MANAGER", and acquires the group "G002" to which the user with the user ID "U003" has belonged and their title "none", by referring to the records 78 and 80 of the user information.

In step S82, the registration permission determining unit 48 determines whether to allow registration of the registration candidate document, by comparing a pair of the group and the title of the new registrant acquired in step S80 with a pair of the group and title of each of the previous registrant acquired also in step S80. More specifically, the registration permission determining unit 48 determines whether to allow registration, by determining whether there is a pair satisfying conditions that the belonging group ID of the previous registrant includes the belonging group ID of the new registrant and that the title of the previous registrant is identical to the title of the new registrant.

In this exemplary embodiment, a pair of the group to which the new registrant belongs and their title is "G003" and "none". On the other hand, a pair of the group and the title in the record 78 extracted from the user information is "G001, G002, G003" and "MANAGER" and a pair of the group and the tile in the record 80 is "G002" and "none". Accordingly, neither the record 78 nor the record 80 satisfies the conditions that the groups to which the previous registrant has belonged include the group to which of the new registrant belongs and that the title of the previous registrant is identical to the title of new registrant. Thus, in this exemplary embodiment, the determination for the extracted word "DocuTray" in step S82 is "NO", so that a determination is made not to allow registration of the registration candidate document. If the determination is "NO" in step S82, the process proceeds to step S66.

In step S66, the reporting unit 54 acquires information on administrators of groups to which the respective previous registrants who registered the records extracted in step S52 have belonged, on the basis of the user information and the group information. In this exemplary embodiment, the reporting unit 54 acquires the belonging group IDs "G001, G002, G003" of the previous registrants who registered the records 64 and 66. Further, the reporting unit 54 acquires the administrator ID "U001" of the group ID "G001", the administrator ID "U001" of the group ID "G002", and the administrator ID "U001" of the group ID "G003", by referring to records 96, 98, and 100 of the group information of FIG. 4 in the storage unit 22. In this step, the reporting unit 54 may also acquire the group names of the group IDs "G001", "G002", and "G003", together with the administrator IDs, on the basis of the group name column 92.

The reporting unit 54 further acquires information on the user with the administrator ID "U001", by referring to the user information of FIG. 3. In this exemplary embodiment, the reporting unit 54 acquires the user name "TARO FUJI" of the user ID "U001", by referring to the record 78.

Figure 12:
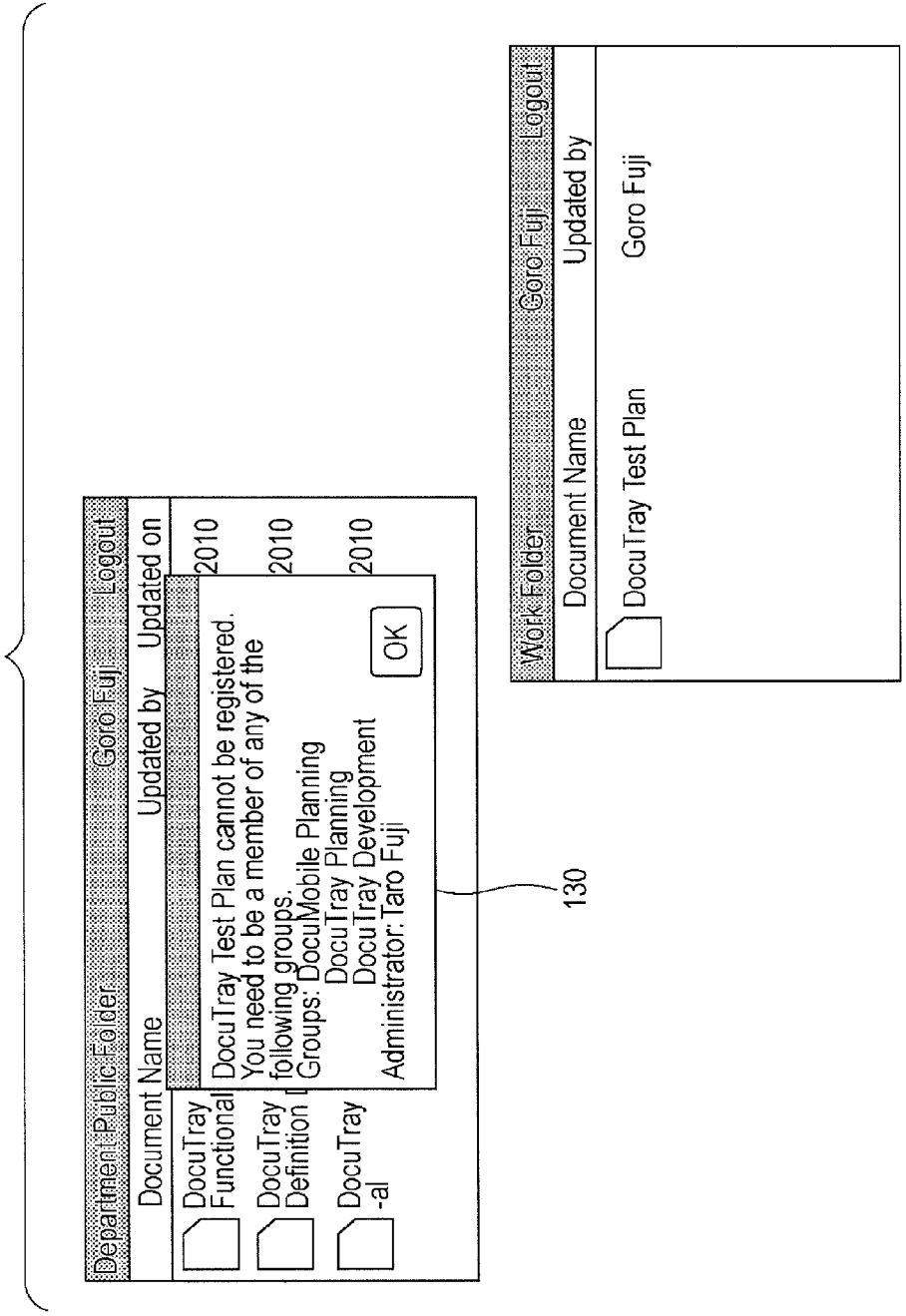
FIG. 12 illustrates an image for reporting information on an administrator.

In step S68, the reporting unit 54 reports the information on the administrator acquired in step S66 to the client terminal 2. FIG. 12 illustrates an image for reporting the information on the administrator. The reporting unit 54 causes the display unit 18 to display an image containing a pop-up 130 as illustrated in FIG. 12, which contains information on the administrator, for example, and reports the information on the administrator to the new registrant. The information displayed in the pop-up 130 includes the group name of the group to which the user is required to belong to register the document, and the user name of the administrator of the group. In addition to these pieces of information, the title that the user is required to hold to register the document may be displayed.

For example, if a user belonging to a group other than the "DocuTray Planning" group attempts to register an electronic document created for the "DocuTray Planning" group, a determination may be made not to allow registration in the document registration apparatus 3. In this case, the new registrant needs to contact the administrator of the "DocuTray Planning" group so as to register the document. Accordingly, the reporting unit 54 reports, to the new registrant, information on the administrator of the group to which the previous registrant has belonged.

Third Exemplary Embodiment

In the first and second exemplary embodiments, the belonging group IDs of all the groups to which a user corresponding to each record has belonged are stored in the belonging group ID column 74 of the user information, and the belonging group IDs of all the groups that the previous registrants have belonged are extracted as the belonging group IDs of the previous registrants in step S54. In a third exemplary embodiment, as a belonging group ID of a previous registrant, only a belonging group ID of a group to which a previous registrant belonged at the time of registration of a registered word.

FIG. 13 illustrates the data configuration of history information according to a third exemplary embodiment. In the third exemplary embodiment, a table indicating history information further includes a registration date column 140. The registration date column 140 stores the registration date when each of the previous registrants registered a registered word.

For example, in FIG. 13, a record 142 indicates that a registered word "DocuTray" was registered by the user with the user ID "U001" on "2010/04/01". Although the history information of FIG. 13 contains the year, month, and day of registration as the registration date, the history information may contain the registration date together with registration time at the level of hours, minutes, or seconds.

FIG. 14 illustrates an example of the data configuration of user information according to the third exemplary embodiment. In the third exemplary embodiment, in the table indicating the user information, a belonging group ID column 150 stores the group ID indicating a group to which the user corresponding to each record has belonged, together with information indicating the period during which the user belonged or belongs to the group. Further, a title column 152 stores the title held by the user corresponding to each record, together with information indicating the period during which the title was held or is held by the user.

For example, in FIG. 14, in the record 154, "G001 (2000/04/01:2005/03/31), G002 (2005/04/01:2010/03/31), G003

(2010/04/01:)" as belonging group IDs and "MANAGER (2008/04/01:)" as a title are associated with the user ID "U001" and the user name "TARO FUJI". Herein, "(2005/04/01:2010/03/31)" indicates a period from Apr. 1, 2005 to Mar. 31, 2010, and "(2010/04/01:)" indicates a period from Apr. 1, 2010 to the present. That is, the record 154 indicates that "TARO FUJI" belonged to a group with the group ID "G001" from Apr. 1, 2000 to Mar. 31, 2005, belonged to a group with the group ID "G002" from Apr. 1, 2005 to Mar. 31, 2010, and belongs to a group with the group ID "G003" from Apr. 1, 2010 to the present.

Similarly, the record 154 indicates that "TARO FUJI" has no title until Mar. 31, 2008, and has a title "MANAGER" from Apr. 1, 2008 to the present.

Figure 15A:
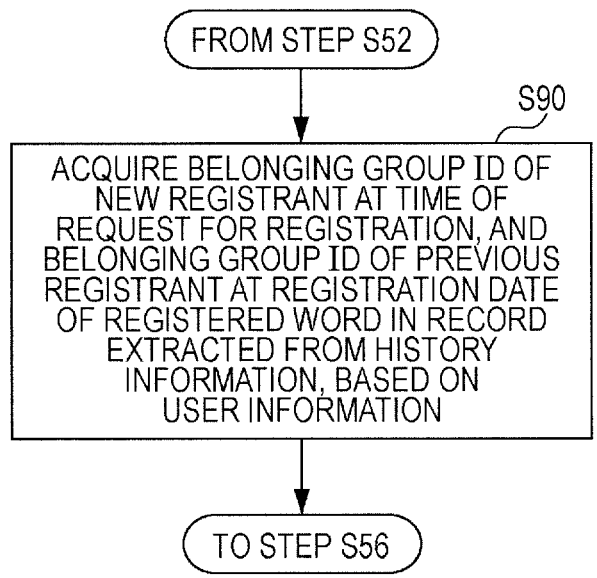
FIGS. 15A and 15B are flowcharts each illustrating the flow of processing according to the third exemplary embodiment.
Figure 15B:
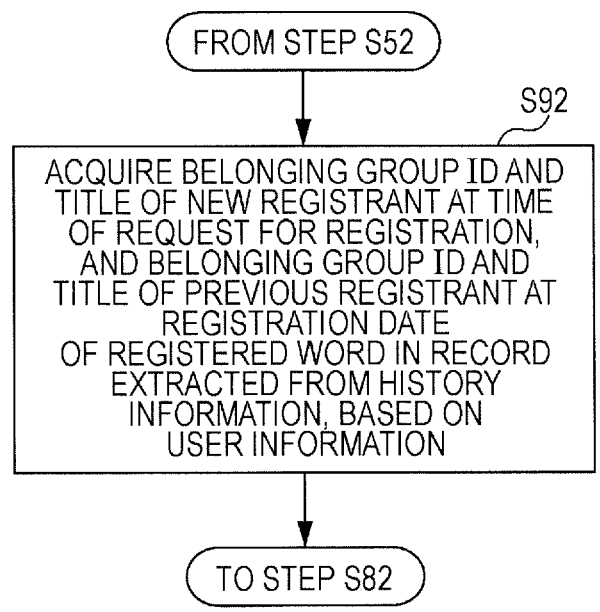

FIGS. 15A and 15B are flowcharts each illustrating the flow of processing according to the third exemplary embodiment. The third exemplary embodiment differs from the first and second exemplary embodiments only in the processing of steps S54 and S80, and the processing of the other steps is the same. Therefore, a description of the steps already described will be omitted.

Referring to the flowchart of FIG. 15A, in step S90, the registration permission determining unit 48 acquires the group to which the new registrant belongs at the time of request for registration (that is, at this time), on the basis of the user ID of the new registrant acquired in step S32 and the user information of FIG. 14. In this exemplary embodiment, it is assumed that the date of request for registration is Apr. 1, 2013. The registration permission determining unit 48 recognizes that a new registrant with the user ID "U005" associated with the word "DocuTray" extracted from the registration candidate document belongs to the group "G003" from Apr. 1, 2010 to the present, by referring to a record 158. Thus, the registration permission determining unit 48 acquires "G003" as the belonging group ID of the new registrant at the time of request for registration.

Subsequently, the registration permission determining unit 48 acquires the belonging group ID of the previous registrant at the registration date of the registered word, on the basis of the user ID and the registration date in the record extracted in step S52 and the user information of FIG. 14. In this exemplary embodiment, the registration permission determining unit 48 acquires the user ID "U001" of the previous registrant and the registration date "2007/04/01" from the record 142 of the history information, and acquires the belonging group ID "G002" of the user ID "U001" at the time of "2007/04/01", on the basis of a record 154 of the user information. In this exemplary embodiment, the registration permission determining unit 48 also acquires the user ID "U003" of the previous registrant and the registration date "2010/02/03" from a record 144 of the history information, and acquires the belonging group ID "G002" of the user ID "U003" at the time of "2010/02/03", on the basis of a record 156 of the user information. Accordingly, the group to which the previous registrants belonged is "G002".

After that, in step S56 and the following steps, the same processing as that in the first exemplary embodiment is performed. In the third exemplary embodiment, the belonging group ID of the new registrant at the time of request for registration is "G003", and the belonging group ID of each of the previous registrants acquired in step S90 is "G002". Thus, the determination in step S56 is "NO", so that a determination is made not to allow registration of the registration candidate document containing the word "DocuTray".

Referring to the flowchart of FIG. 15B, in step S92, the registration permission determining unit 48 acquires the group to which the new registrant belongs at the time of request for registration (that is, at this time) and their title, on the basis of the user ID of the new registrant acquired in step S32 and the user information of FIG. 14. The registration permission determining unit 48 recognizes that a new registrant with the user ID "U005" associated with the word "DocuTray" extracted from the registration candidate document belongs to the group "G003" from Apr. 1, 2010 to the present and that the user has no title over the entire period, by referring to the record 158. Thus, the registration permission determining unit 48 acquires "G003" as the belonging group ID of the new registrant at the time of request for registration, and "none" as the title at the time of request for registration.

Subsequently, the registration permission determining unit 48 acquires the belonging group ID and the title of the previous registrant at the registration date of the registered word, on the basis of the user ID and the registration date in the record extracted in step S52 and the user information of FIG. 14. In this exemplary embodiment, the registration permission determining unit 48 acquires the user ID "U001" of the previous registrant and the registration date "2007/04/01" from the record 142 of the history information, and acquires the belonging group ID "G002" and the title "none" of the user ID "U001" at the time of "2007/04/01", on the basis of the record 154 of the user information. In this exemplary embodiment, the registration permission determining unit 48 also acquires the user ID "U003" of the previous registrant and the registration date "2010/02/03" from the record 144 of the history information, and acquires the belonging group ID "G002" of the user ID "U003" and the title "none" at the time of "2010/02/03", on the basis of the record 156 of the user information.

After that, in step S82 and the following steps, the same processing as that in the second exemplary embodiment is performed. In the third exemplary embodiment, a pair of the belonging group ID and the tile of the new registrant at the time of request for registration is "G003" and "none". On the other hand, a pair of the belonging group ID and the tile of each of the previous registrants at the registration date extracted from the history information is "G002" and "none". Thus, the determination in step S82 is "NO", so that a determination is made not to allow registration of the registration candidate document containing the word "DocuTray".

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document registration apparatus comprising:
   at least one processor configured to execute:
      a receiving unit that receives a request for registration of a registration candidate document from a new registrant;
      a word extracting unit that extracts a word from the registration candidate document;
      a registrant information acquiring unit that acquires information on the new registrant; and an associating unit that associates the word extracted from the registration candidate document with information indicating a group to which the new registrant belongs;

at least one memory comprising:
- a first storage unit that stores history information, the history information containing a registered word that is extracted from a document previously requested to be registered and an identifier of a previous registrant who registered the registered word, in association with each other; and
- a second storage unit that stores the identifier of the previous registrant and information indicating a group to which the previous registrant has belonged, in association with each other;

wherein the at least one processor is further configured to execute:
- an extracting unit that reads the history information from the first storage unit, extracts an identifier of a previous registrant who previously registered a registered word identical to the word extracted from the registration candidate document, on the basis of the history information, and extracts a group to which the previous registrant has belonged, on the basis of the identifier of the previous registrant and association stored in the second storage unit;
- a registration permission determining unit that determines whether to allow registration of the registration candidate document, on the basis of whether the group to which the new registrant belongs is included in the group to which the previous registrant has belonged; and
- a document registering unit that registers the registration candidate document, if the registration permission determining unit determines to allow the registration.

2. A document registration apparatus comprising:
at least one processor configured to execute:
- a receiving unit that receives a request for registration of a registration candidate document from a new registrant;
- a word extracting unit that extracts a word from the registration candidate document;
- a registrant information acquiring unit that acquires information on the new registrant; and
- an associating unit that associates the word extracted from the registration candidate document with information indicating a title of the new registrant;

at least one memory comprising:
- a first storage unit that stores history information, the history information containing a registered word that is extracted from a document previously requested to be registered and an identifier of a previous registrant who registered the registered word, in association with each other; and
- a second storage unit that stores the identifier of the previous registrant and information indicating a title of the previous registrant, in association with each other;

wherein the at least one processor is further configured to execute:
- an extracting unit that reads the history information from the first storage unit, extracts an identifier of a previous registrant who previously registered a registered word identical to the word extracted from the registration candidate document, on the basis of the history information, and extracts a title of the previous registrant, on the basis of the identifier of the previous registrant and association stored in the second storage unit;
- a registration permission determining unit that determines whether to allow registration of the registration candidate document, on the basis of whether the title of the new registrant is identical to the title of the previous registrant; and
- a document registering unit that registers the registration candidate document, if the registration permission determining unit determines to allow the registration.

3. The document registration apparatus according to claim 1, wherein:
- the history information includes information indicating a time point when the previous registrant registered the registered word, in association with the registered word;
- the information indicating a group to which the previous registrant has belonged includes information indicating a period during which the previous registrant has belonged to the group; and
- the registration permission determining unit determines to allow registration of the registration candidate document, if the group to which the new registrant belongs is included in the group to which the previous registrant belonged at a time point when the previous registrant registered the registered word identical to the word extracted from the registration candidate document.

4. The document registration apparatus according to claim 2, wherein:
- the history information includes information indicating a time point when the previous registrant registered the registered word, in association with the registered word;
- the information indicating a title of the previous registrant includes information indicating a period during which the title has been held by the previous registrant; and
- the registration permission determining unit determines to allow registration of the registration candidate document, if the title of the new registrant is identical to the title of the previous registrant at a time point when the previous registrant registered the registered word identical to the word extracted from the registration candidate document.

5. The document registration apparatus according to claim 1, wherein the first storage unit stores group information containing a group and information indicating an administrator of the group in association with each other, the document registration apparatus further comprising:
- a reporting unit that reports, to the new registrant, information indicating an administrator of the group to which the previous registrant has belonged, on the basis of the group information, if the registration permission determining unit determines not to allow the registration.

6. The document registration apparatus according to claim 1, further comprising:
- a word registering unit that registers the word extracted from the registration candidate document and information indicating the new registrant in association with each other, as the history information in the first storage unit, in accordance with an instruction from the new registrant, if a registered word identical to the word extracted from the registration candidate document is not contained in the history information.

7. The document registration apparatus according to claim 1, wherein the word extracting unit performs morphological analysis on entire text of the registration candidate document, and extracts a word that is identified as an unknown word by the morphological analysis.

8. A non-transitory computer readable medium storing a program causing a computer to execute a process for document registration, the process comprising:

receiving a request for registration of a registration candidate document from a new registrant;

extracting a word from the registration candidate document;

acquiring information on the new registrant;

associating the word extracted from the registration candidate document with information indicating a group to which the new registrant belongs;

first storing history information, the history information containing a registered word that is extracted from a document previously requested to be registered and an identifier of a previous registrant who registered the registered word, in association with each other;

second storing the identifier of the previous registrant and information indicating a group to which the previous registrant has belonged, in association with each other;

reading the history information stored in the first storing, extracting an identifier of a previous registrant who previously registered a registered word identical to the word extracted from the registration candidate document, on the basis of the history information, and extracting a group to which the previous registrant has belonged, on the basis of the identifier of the previous registrant and association stored in the second storing;

determining whether to allow registration of the registration candidate document, on the basis of whether the group to which the new registrant belongs is included in the group to which the previous registrant has belonged; and registering the registration candidate document, if the determining determines to allow the registration.

9. A method for document registration, the method comprising:

receiving a request for registration of a registration candidate document from a new registrant;

extracting a word from the registration candidate document;

acquiring information on the new registrant;

associating the word extracted from the registration candidate document with information indicating a group to which the new registrant belongs;

first storing history information, the history information containing a registered word that is extracted from a document previously requested to be registered and an identifier of a previous registrant who registered the registered word, in association with each other;

second storing the identifier of the previous registrant and information indicating a group to which the previous registrant has belonged, in association with each other;

reading the history information stored in the first storing, extracting an identifier of a previous registrant who previously registered a registered word identical to the word extracted from the registration candidate document, on the basis of the history information, and extracting a group to which the previous registrant has belonged, on the basis of the identifier of the previous registrant and association stored in the second storing;

determining whether to allow registration of the registration candidate document, on the basis of whether the group to which the new registrant belongs is included in the group to which the previous registrant has belonged; and registering the registration candidate document, if the determining determines to allow the registration.

\* \* \* \* \*